Patented Apr. 15, 1952

2,593,146

UNITED STATES PATENT OFFICE 2,593,146

LAMINATED PAPER CONTAINING ACTIVATED CARBON

Fred Howard, Leigh, England, assignor to Sutcliffe, Speakman & Company Limited, Leigh, England, a British joint-stock corporation No Drawing. Application November 26, 1946, Serial No. 712,241. In Great Britain October 19, 1945

3 Claims. (Cl. 154—50)

The invention relates to the production of paper or like materials that are adapted for use in the wrapping or enclosure of goods from which odours or vapours usually emanate or of goods, such for example as butter or other materials of a fatty or greasy character, that are liable to absorb such odours or vapours from other substances set in their vicinity.

The dissemination of odours or vapours from certain odiferous foodstuffs, or liquids or pharmaceutical products occurs under normal conditions of temperature, pressure and humidity. This dissemination may be the result of changes in the composition of the materials while in storage or in transit from place to place. Thus for example it has been shown that the odour of fresh fish is due to amino-acids, the odour of putrified fish is due to amines, the odour of fruit is due to esters, the odour of decaying vegetable matter is due to carbon bisulphide and hydrogen sulphide, the odour of rancid butter is due to butyric acid, the odour of onions is due to diallyl sulphide; and that these odours or volatile products or constituents are gases and vapours at normal temperatures and pressures.

The invention is based upon my discovery that if a packaging material of a porous character, such as paper, has thoroughly incorporated in it a sufficient quantity of activated carbon in a finely divided state, and the packaging material is then employed for the wrapping or enclosure of such odoriferous substances, the odour or gas or vapour emanating from the odoriferous substance is adsorbed by the activated carbon and no odour is discernible at the outer surface of the package.

The activated carbon may be produced in known manner for example from coconut shell, or it may be derived from coal or any other carbon bearing substance and the porous product may have been activated by the use in known manner of steam or chlorine or other gases or dehydrating agents such as zinc chloride, phosphoric acid, sulphuric acid and the like.

Furthermore the activated carbon may be treated to render its use more effective in particular cases. Thus the activated carbon may be improved in its sorptive capacity, for odours or emanations from decomposed or partially decomposed foodstuffs, by being first impregnated with formaldehyde, while the application of a solution of a copper salt upon the activated carbon serves to remove prussic acid.

It will be understood that the sorptive power of the activated carbon is dependent upon its total sorptive capacity, and thus upon the proportions of activated carbon used.

The packaging material or the inner layer of the packaging material may be conveniently produced from paper, cardboard, or the like that is adapted to hold the finely divided activated carbon.

The finely divided activated carbon may be uniformly incorporated in the paper pulp by adding it at the beaters or elsewhere in a wide range of proportion, with or without an addition of sizing materials such as rosin size and aluminium sulphate and also amino resins of the urea formaldehyde, melamine formaldehyde, and other types which convey high wet strength characteristics to the paper.

The paper pulp may be processed as usual in the production of paper, the paper web being passed over heated drying cylinders, whereupon the paper incorporating the finely divided activated carbon may be ready for use in the production of packaging material and may be cut into sheets or made into bags or carriers, which have applied thereto an outer layer of impervious paper or the equivalent.

Similarly receptacles or sheets may be produced from cardboard, the activated carbon being similarly incorporated or applied in a determined proportion in or on the stock or pulp used.

Or again the finely divided activated carbon may be applied upon a layer of absorbent paper and an outer layer of impervious paper may be applied and secured at its outer face.

Or again the activated carbon may be applied between sheets or webs of paper and felt or fabric, that together may be subject to pressure in passing through rolls and subjected to heat in passing over heated drying cylinders, the outer sheet or web being advantageously of impervious paper while the inner sheet or web is porous.

It will be understood that the wrapping or packaging produced in the manner described not only prevents in its use the dissemination of odour or vapour from odoriferous foodstuffs or other substances, but protects other foodstuffs or substances, such as butter or other materials of a fatty or greasy character, from adsorption of odours emanating from other odoriferous substances placed in their vicinity.

Fatty or oil material may with advantage be first wrapped in greaseproof paper, or the paper pulp used in the production of the greaseproof paper may itself be impregnated with activated carbon in a finely divided condition.

Cardboard stock having such activated carbon similarly incorporated in a finely divided state may be used in the form of sheets for division or partition walls or linings for example in refrigerators or cupboards or containers, or may be made up into cartons or receptacles of various sizes and shapes, and the outer face of the cardboard may be covered with an outer layer of impervious paper or other material.

I have found that the incorporation of activated carbon in the paper pulp does not materially affect the process of paper manufacture thus permitting the production of the paper without any material modification of the usual processing conditions, and without any other necessary change in the materials used.

I claim:

1. A laminated paper sheet for packaging foodstuffs for preventing the passage therethrough of food odors, comprising inner and outer layers of paper secured together, one of said layers being substantially impervious and the other of said layers having finely divided activated carbon particles uniformly distributed throughout, which acts to adsorb food odors and thereby prevents the passage of said odors into or out of the paper sheet.

2. The laminated paper sheet set forth in claim 1 wherein said activated carbon is impregnated with formaldehyde.

3. The laminated paper sheet set forth in claim 1 wherein said paper layer containing the activated carbon has an amino resin selected from the group consisting of urea formaldehyde resin and melamine formaldehyde resin thoroughly incorporated therein to impart wet strength characteristics to the paper.

FRED HOWARD.

REFERENCES CITED

The following references are of record in the file of this patent:

UNITED STATES PATENTS

| Number | Name | Date |
|---|---|---|
| 328,947 | Johnson | Oct. 27, 1885 |
| 622,325 | Brunswig | Apr. 4, 1899 |
| 827,863 | Greenstreet | Aug. 7, 1906 |
| 1,621,888 | Kirschbraun | Mar. 22, 1927 |
| 1,657,272 | Nuesbaum | Jan. 24, 1928 |
| 1,725,647 | Kirschbraun | Aug. 20, 1929 |
| 1,798,164 | Kuhn et al. | Mar. 31, 1931 |
| 2,087,480 | Pitman | July 20, 1937 |
| 2,286,964 | Hucks | June 16, 1942 |

FOREIGN PATENTS

| Number | Country | Date |
|---|---|---|
| 655,783 | Germany | Jan. 22, 1938 |
| 189,562 | Great Britain | Dec. 5, 1922 |
| 310,625 | Great Britain | May 2, 1929 |

OTHER REFERENCES

Paper Industry and Paper World, June 1943, pages 263–269.

Paper Trade Journal, May 13, 1943, page 41.